Figure 1:
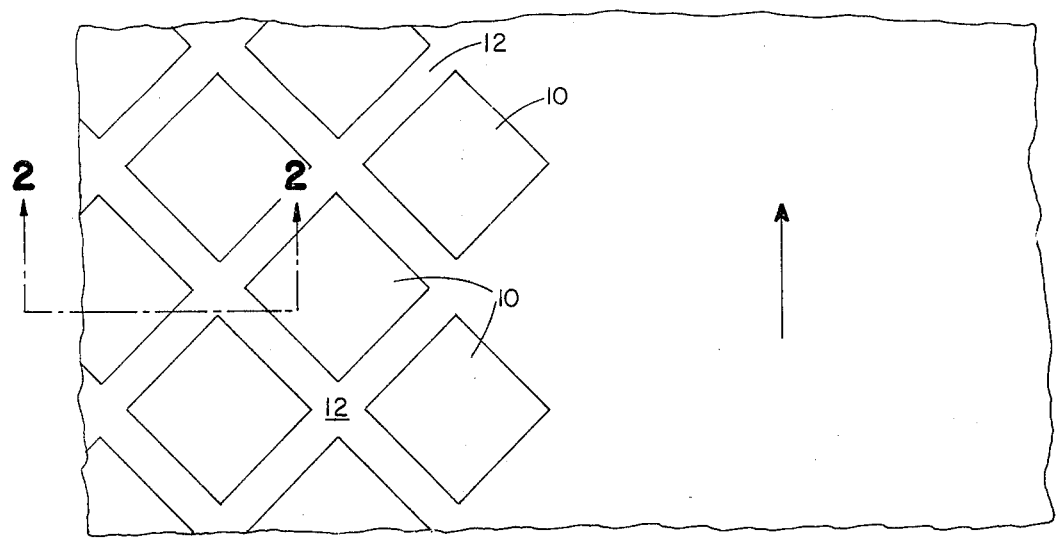

United States Patent [19]

Lawson et al.

[11] 4,119,543
[45] Oct. 10, 1978

[54] FILTER MEDIUM AND METHOD OF MAKING SAME

[75] Inventors: Grover C. Lawson; James C. Wilson, both of Greenwich, N.Y.

[73] Assignee: Hollingsworth & Vose Company, East Walpole, Mass.

[21] Appl. No.: 813,953

[22] Filed: Jul. 8, 1977

Related U.S. Application Data

[63] Continuation-in-part of Ser. No. 691,420, Jun. 1, 1976, abandoned.

[51] Int. Cl.² .................. B01D 27/02; B01D 27/04; B01D 39/14
[52] U.S. Cl. .................. 210/496; 55/524; 55/528; 210/504; 210/505; 210/508
[58] Field of Search .................. 210/496, 500 R, 503, 210/504, 505, 506, 508, 509; 55/522, 524, 527, 528

[56] References Cited

U.S. PATENT DOCUMENTS

| | | | |
|---|---|---|---|
| 2,895,868 | 7/1959 | Magill | 210/508 |
| 3,096,230 | 7/1963 | Briggs | 210/508 |
| 3,116,245 | 12/1963 | McNabb et al. | 210/508 |
| 3,158,532 | 11/1964 | Pall et al. | 210/503 |
| 3,520,416 | 7/1970 | Keedwell | 210/504 |

Primary Examiner—Frank Sever

[57] ABSTRACT

A filter medium particularly adapted for use in an oil filter for an internal combustion engine having a water-laid web of fibers, at least 70% of which are cellulose, impregnated with resin in a pattern at its wire side to a depth of 15 to 45% of its total thickness, the pattern having zones free from resin amounting to 35 to 60% of the total area of the wire side, each zone having at least one dimension no greater than 4 mm.

14 Claims, 2 Drawing Figures

FILTER MEDIUM AND METHOD OF MAKING SAME

This application is a continuation-in-part of our pending application Ser. No. 691,420 filed June 1, 1976, now abandoned.

This invention relates to a filter medium and pertains more specifically to a filter medium particularly useful in a pleated filter for hydrocarbon oils, as in an oil filter for a internal combustion engine such as a diesel or gasoline engine, and it can also be used in air filter or fuel filter for such engines.

It has previously been proposed in McNabb et al. U.S. Pat. No. 3,116,245 to provide a filter medium by first making a water-laid web of specially selected cellulose fibers of high purity, then impregnating the web from the wire side with a resin which penetrates approximately one-half the thickness of the web. It has also been proposed in Briggs U.S. Pat. No. 3,096,230 to provide a filter medium by impregnating a paper with thermosetting resin to approximately one-third of its thickness and coating with cold pressed castor oil. It has also been proposed in Keedwell U.S. Pat. No. 3,520,416 to impregnate a fibrous filter sheet in a pattern extending entirely through the sheet with selected materials including resins so that some zones of the sheet are liquid repellent and others are liquid wetting, the impregnated sheet consequently being permeable to gas even after saturation with liquid. Moreover, in the case of fibrous sheet products particularly useful as electrical insulation, it has been proposed, in Ford U.S. Pat. No. 2,399,338 to apply laminating adhesive to one face of a fibrous sheet in a pattern of stripes, and in Grimes U.S. Pat. No. 3,203,823, Leonard et al. U.S. Pat. No. 3,071,845, and Ford U.S. Pat. No. 3,246,271, it has been proposed to apply adhesive resin to one or both sides of a fibrous sheet of electrical insulation in various patterns.

Moreover, fibrous sheets impregnated throughout their area to a depth of about 100% of their thickness have been widely used in a pleated annular configuration such as that shown in McNabb U.S. Pat. No. 3,116,245 as oil filters for internal combustion engines; extensive standard test specifications have been devised for evaluating the performance of oil filters, indentified as SAE J-806a (Rev. 1972). Among the more important characteristics measured by these tests are (1) contaminant holding capacity, i.e., the quantity of solid contaminant particles which the filter is capable of removing from flowing oil and holding without excessive increase in pressure drop through the filter; (2) filtering efficiency, i.e., the percentage of finely-divided solid contaminant particles removed from oil passage; (3) media migration, i.e., the quantity of contaminant material introduced into the flowing oil stream by its passage through the filter, comprising primarily small fibers or particles released from the filter medium; (4) collapse, i.e., tendency of the pleated filter unit to collapse or tear because of high differential pressure due to cold oil or accumulation of contaminant on or within the filter medium during use or both. Experience has indicated that alteration of a resin-impregnated fibrous web filter medium in an effort to improve its performance with respect to one or more of the foregoing characteristics has resulted in a decrease in its performance with respect to other remaining characteristics. Because of the apparently mutually exclusive or contradictory nature of the requirements to improve the performance of filter media with respect to all of the foregoing characteristics, little progress has been made in overall improvement of the filter medium since widespread adoption of resin-impregnated fibrous web filter media.

The present invention comprises a filter mediun which provides not only greatly improved contaminant holding capacity and efficiency as compared to commercially available oil filter media impregnated with resin throughout their entire surface area to the full extent of their thickness, but at the same time meets the requirements for minimal media migration and resistance to collapse. The substantial improvement in some characteristics demonstrated by the filter medium of the present invention without concomitant substantial worsening of one or more of the remaining characteristics renders the filter medium unique. The filter medium of the invention comprises a water-laid web of fibers including at least 70% by weight of cellulose fibers, the web having a ream weight of 35 to 180 lb., (3,000 sq.ft. ream), the web being impregnated with resin in a pattern at its wire side to a depth from 15 to 45% of the total thickness of the web, the amount of the resin being from 9 to 15% by weight of the web, preferably from 11 to 15% by weight of the web, the pattern having first zones free from the resin and other zones impregnated with the resin, at least one surface dimension of each of the first said zones being from 0.1 to 4 mm., the total area of the first said zones being from 35 to 60% of the total surface area of the wire side, and the air porosity of the impregnated web being from 1 to 200 CFM per sq.ft. at a pressure drop of 0.5 in. water on a Frazier Porosity Tester.

The water-laid fibrous web of the present invention can be made on a Fourdrinier machine or on a Rotoformer machine; in either case, it is the side next to the Fourdrinier wire or next to the Rotoformer wire, as the case may be, called the "wire side", which is resin-impregnated. The fibers in the furnish used to make the web include at least 70% by weight of cellulose fibers. These may be alpha cellulose fibers of high purity if desired, but low purity (having an average alpha cellulose content less than 90% by weight) may also be used, and a filter medium made of such low purity fibers is particularly important because the present invention makes it possible to upgrade very markedly the contaminant holding capacity of a filter medium containing such fibers as compared to a filter medium of the prior art made from comparable fibers. For example, there can be used as the cellulose fibers in the present invention, fibers from cotton linters, wood pulp, reclaimed paper fibers, and other cellulose fibers from similar sources, either bleached or unbleached. Various synthetic fibers may also be present in amounts up to 30% by weight of the total fibers; among suitable synthetic fibers are those of glass, rayon, nylon, polyester or acrylic composition and the like. Such synthetic fibers, when present, are preferably of dimensions from 0.5 to 20 denier cut 3.2 to 12.7 mm. in length.

Figure 2:
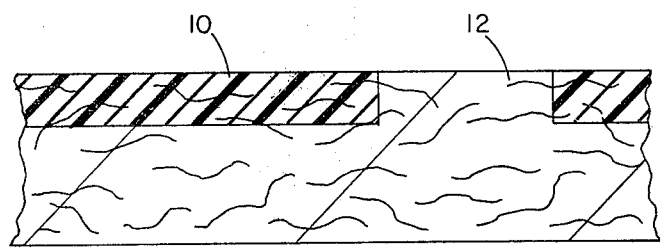

In the accompanying drawing,

FIG. 1 is a plan view of one embodiment of the invention as viewed from the wire side of the web on an enlarged scale, machine direction of the web being shown by the arrow, and, FIG. 2 is a view in cross-section taken along line 2—2 of FIG. 1.

The water-laid web of fibers should have a ream weight (3,000 sq.ft.) of 35–180 lb. There may be present, if desired, any of the usual wet strength resins in the usual amounts; for example, an acid colloid melamine resin or an anionic or cationic urea resin in the usual amount from 0.5 to 2.5% based on the total fiber content when added in the beater or 5 to 7% based on the cured weight of the web when added in a saturater. This relatively small amount of wet strength resin, when it is present, is uniformly distributed throughout the web and helps to minimize fiber migration in the finished web.

The water-laid web of fibers, following its formation, is dried in the usual manner, then impregnated with resin in a pattern at its wire side to a depth from 15 to 45% of the total thickness of the web. The resin employed may be any desired thermoplastic or thermosetting resin capable of acting as a binder or reinforcing agent, including such resins as phenol-formaldehyde, urea-formaldehyde, melamine-formaldehyde, polyvinyl acetate, polyvinyl chloride, polyacrylates, and combinations of any one or more of the foregoing. Of these, liquid thermosetting resins, particularly phenol-formaldehyde resins, are often preferred. The resin can be applied to the web with a liquid vehicle in the form of a solution of the resin in an organic solvent, but water is the preferred vehicle, the resin being applied in the form of an aqueous mixture. In either case, in order to attain the desired depth of penetration from the wire side of the web, it is preferred to adjust the viscosity of the resin solution or mixture to the range from 8,000 to 50,000 centipoises. This high viscosity makes it possible to use a high total solids resin solution or mixture, thus minimizing the amount of liquid vehicle to be evaporated and also minimizing the cost of manufacture.

The amount of resin (dry solids content) with which the web is pattern-impregnated should be from 9 to 15% by weight of the web to which it is applied (the weight of the web including any wet strength resin present in the web in addition to the fibers).

The pattern in which the resin is applied should be one which provides zones of the web, viewed from the wire side, which are free from resin, and other zones which are impregnated with resin; the total area of the zones free from resin should be from 35 to 60% of the total surface area of the wire side of the web. The pattern may be such that either the impregnated or non-impregnated zones are in the form of stripes or of discontinuous discrete areas, one of which is surrounded by the other, as in a grid, for example. In the embodiment shown in FIG. 1 of the drawing, the areas 10 are impregnated with resin, while the spaces 12 between them are free from resin. Either of the zones may be of any desired geometrical shape or configuration such as circles, ellipses, annuli, rectangles, triangles, regular or irregular polygons or even more complex designs including those which have aesthetic value or which convey information such as monograms, words, or pictures, provided only that each unimpregnated surface zone has at least one surface dimension which is from 0.1 to 4 mm. For this purpose, each such zone is considered to have only two surface dimensions, measured at right angles to each other. Stated another way, the size and shape of each surface zone which is free from resin must be such that the distance from any point on the surface of each zone to the nearest edge of the zone must be from 0.05 to 2 mm. In the case of a pattern in which one dimension of the resin free zone is greater than 4 mm., the other being 4 mm. or less, it is preferred that the pattern should be arranged so that the longer dimension should extend transversely of the machine direction of the web, while the shorter dimension extends parallel to, or more nearly parallel to, the machine direction of the web. For example, in the case of a pattern of straight parallel stripes, preferably the stripes extend at an angle from 35° to 90° from the machine direction of the web.

After the pattern impregnation of the web with resin, the impregnated web may be heated to dry it and to effect such partial advancement of the resin as may be desired, in the case of thermosetting resins. In this form it can be stored or shipped. In the case where the web is to be subsequently folded or otherwise shaped to fit into a housing, for example, in the case of a pleated filter cartridge for lubricating oil, as shown in McNabb et al. U.S. Pat. No. 3,116,245, the filter medium may be subsequently heated to facilitate pleating, after which it may be given a final cure in the case of thermosetting resins. In the case of a web impregnated with a phenol-formaldehyde resin, the resin may be advanced to the B-stage with the web in flat condition, after which it it may be cut to size, pleated and shaped, then the resin may be cured to the desired C-stage.

A filter medium made in accordance with the present invention displays an air porosity or permeability from 1 to 200 CFM per sq.ft. at a pressure drop of 0.5 in. water on a Frazier Porosity Tester under standard conditions as described by Schiefer et al., J. Research Nat. Bur. Standards, Vol. 28, 637–642 (1942), and is useful either as an air filter or as a liquid filter.

In using the filter medium of the present invention, the impregnated or wire side of the web should be the downstream side.

EXAMPLE 1

A series of fibrous sheets or webs was prepared on a Rotoformer machine from an aqueous furnish containing 100% cotton linter fibers (fiber length 2–4 mm.) having different ream weights as set forth in the following Table I. Wet strength resin (0.7% based on the dry weight of the fiber) was introduced into the slurry of fibers. After formation and drying of the web in the usual manner, the wire side of several different samples was pattern-impregnated on the wire side with an aqueous mixture of 45% by weight of phenol-formaldehyde resin (Aerotap 557) and 55% polyvinyl acetate (Polyco 2113) thickened with polyacrylate (Rhoplex ASE 60) to provide a viscosity of 20,000 cps. The resin mixture was applied to the wire side of each sample in a grid pattern as shown in FIG. 1 on a gravure roll, dried, and heated at 130° C. for 1 to 3 minutes to advance the phenol-formaldehyde resin to the B-stage. Sectioning of the finished product showed that the resin penetrated approximately 30% of the total thickness of the web from the wire side. The grid pattern consisted of an impregnated zone in the form of rows of squares, each square being 2 mm. on a side and spaced 0.7 mm. from each adjacent square, each row extending at 45° to the machine direction of the web as shown in FIG. 1. The zone which was free from resin (except for the wet strength resin which was uniformly distributed throughout the web) formed a pattern of two sets of parallel stripes intersecting at right angles to each other. Other samples were prepared from the same fiber furnish at various ream weights with no resin pattern impregnation, and still other samples were impregnated at the wire side with the same resin using complete coverage of the wire side and penetration to about 50% of the web thickness.

The samples were pleated, the resin cured to the C-stage by heating for 15 minutes at 150° C. and tested by subjecting them to a flow of lubricating oil containing AC Test Dust as a contaminant in accordance with the standard oil filter test procedure, SAE J-806a (REV. 1972) to determine capacity and efficiency. The results were as follows:

TABLE I

| Impregnation | Ream wt. of web, lb. | Pleat Count | Percent Resin based on cured web | Test Hours | Capacity, grams | Efficiency Percent |
|---|---|---|---|---|---|---|
| No resin | 76 | 58 | None | 6.5 | 6.70 | 37.7 |
| " | 76 | 58 | None | 8.75 | 8.34 | 54.0 |
| Pattern | 83 | 58 | 11.6 | 13.5 | 15.28 | 68.2 |
| " | 83 | 58 | 11.6 | 13.25 | 14.94 | 62.5 |
| Pattern | 85 | 68 | 10.8 | 17.25 | 20.81 | 92.1 |
| " | " | " | " | 15.75 | 19.51 | 94.9 |
| Pattern | 108 | 53 | 12.6 | 16.0 | 19.37 | 87.8 |
| " | " | " | " | 15.25 | 17.40 | 87.6 |
| Complete coverage | 89 | 68 | 13.5–15.5 | 10.5 | 10.68 | 80.6 |
| " | " | " | " | 7.0 | 8.09 | 74.0 |
| Complete coverage | 95 | 53 | 13.5–15.5 | 11.0 | 12.59 | 84.6 |
| " | " | " | " | 9.5 | 9.77 | 80.4 |
| Complete coverage | 112 | 51 | 13.5–15.5 | 16.0 | 13.66 | 79.3 |
| " | " | " | " | 15.0 | 11.66 | 84.5 |

Other tests carried out by the same test procedure using synthetic contaminant SOFTC 2A showed markedly higher capacity for the pattern-impregnated fibrous web of the present invention and somewhat higher efficiency than for similar webs impregnated throughout the complete area of the wire side to a depth of about 50% of the thickness of the web.

Still other webs were prepared from a wood pulp furnish (89% alpha-cellulose or less); some samples of these webs were impregnated in accordance with the present invention using the same pattern, resin formulation, and depth of impregnation or penetration as set forth above, while other samples were fully saturated with resin so that the impregnation extended throughout the entire area of the wire side and through the full thickness of the web. These samples were then tested for capacity and efficiency by the same test procedure as described above, using AC Dust Contaminant, with the following results:

TABLE II

| Impregnation | Ream wt. of web, lb. | Pleat Count | Percent Resin based on cured web | Test Hours | Capacity, Grams | Efficiency, percent |
|---|---|---|---|---|---|---|
| Pattern | 83/86 | 68 | 11.6 | 17.5 | 22.19 | 79.8 |
| " | " | " | " | 17.75 | 22.07 | 83.9 |
| Complete | 83 | 68 | 18.6 | 8.0 | 10.44 | 85.9 |
| " | " | " | 18.6 | 9.0 | 9.65 | 85.9 |

Similar results were obtained in tests where a synthetic sludge contaminant (SOFTC-2A) was used as the test contaminant.

All of the filter media tested satisfied the accepted industry standard for fiber migration (SAEJ 806a) of less than 5 mg. per filter element except the unsaturated webs.

EXAMPLE 2

A single fibrous web was prepared on a Rotoformer machine from an aqueous furnish in which all of the fiber content was wood cellulose fiber (Southern bleached pine), the furnish also containing approximately 1.5–2.0% wet strength melamine-formaldehyde resin by weight based on the dry weight of the fibers, the web having a ream weight of 88–92 lb.

Several different samples of this web were pattern-impregnated on the wire side with an aqueous phenol-formaldehyde resin formulation having the following composition:

|  | Dry solids, percent | Total, including water, percent |
|---|---|---|
| Urea | 3.0 | 0.8 |
| Release agent and lubricant (Aurasoft 216, 100% active) | 19.4 | 5.5 |
| Phenol-formaldehyde resin (Aerotap 8095 W50, 50% solids) | 51.8 | 29.2 |
| Thickener (Rhoplex ASE 60, 28% solids) | 14.5 | 14.5 |
| Triethanolamine | 11.4 | 3.2 |
| Water | — | 46.8 |

The aqueous resin formulation was applied using the same gravure roll as in Example 1, so that the resin content of the cured web was 10.3% by weight, or 11.4% by weight of the unimpregnated web. The impregnated web was dried and heated at 130° C. for 1 to 3 minutes to advance the phenol-formaldehyde to the B-stage. Resin penetrated to approximately 30% of the total thickness of the web from the wire side, the pattern being the same as in Example 1 and shown in FIG. 1.

EXAMPLE 3

Other samples of the same web as described in Example 2 were impregnated as described in that example except that the aqueous resin formulation contained the following composition:

|  | Dry solids, percent | Total, including water, percent |
|---|---|---|
| Urea | 1.7 | 0.8 |
| Release agent and | | |

| | Dry solids, percent | Total, including water, percent |
|---|---|---|
| lubricant (Aurasoft 216, 100% active) | 10.7 | 5.0 |
| Phenol-formaldehyde resin (Aerotap 8095 W50, 50% solids) | 28.7 | 26.5 |
| Thickener (Rhoplex ASE 60, 28% solids) | 8.0 | 13.1 |
| Triethanolamine | 6.3 | 2.9 |
| Polyvinyl acetate (Polyco 2113) | 44.7 | 37.7 |
| Water | — | 14.0 |

The resin solids content of the cured web was 12.1% by weight, or 13.8% by weight of the unimpregnated web. Penetration was approximately 30% of the total thickness of the web from the wire side, and the impregnated web was dried and heated as in Example 2 to provide a product having the same pattern.

Impregnated web samples of each of Examples 2 and 3 were then pleated to form filter units of the configuration shown in McNabb et al. U.S. Pat. No. 3,116,245, the resin was cured to the C-stage by heating for 15 minutes at 150° C., and the filter units were tested in accordance with Chapter 2 of Oil Filter Test Procedure SAE J-806a (Rev. 1972) for capacity and efficiency using AC Fine Test Dust as the contaminant in SAE 30 oil preheated to 180° F. and taking as the end point an increase in the pressure drop across the filter to 8 p.s.i. The results were as follows:

| | Life (Hours to End Point) | Capacity (grams contaminant retained by filter at end point) | Percent Efficiency |
|---|---|---|---|
| Example 2 | 14 | 16.99 | 78.1 |
| | 13 1/2 | 17.25 | 83.6 |
| Example 3 | 14 3/4 | 18.28 | 82.3 |
| | 14 | 17.39 | 81.2 |
| | 13 7/12 | 17.86 | 83.6 |
| | 13 1/4 | 18.64 | 82.7 |

Six samples of each of Example 2 and 3 were tested for media migration in accordance with Chapter 4 of the same test procedure, the average for Example 2 being 1.6 mg/filter (total 9.6 mg for six samples) and for Example 3, 2.20 mg/filter (total 13.2 mg for six samples).

A collapse test was conducted in accordance with Chapter 5 of the same test procedure using some of the same filter units previously used for the Chapter 2 and Chapter 4 tests. The oil was at room temperature, the pressure being gradually increased, and the end point was taken as a sudden decrease in oil pressure, indicating collapse of the center metal tube of the filter unit. Each unit was then inspected to determine the nature of the failure. In addition to collapse of the center tube, many showed a failure of the adhesive bond between the web and the end caps. However, in only one unit out of six of Example 2 was there a failure (fracture) in the impregnated web itself, and in none of the units of Example 3 was there any such failure. The filter units of both Example 2 and Example 3 were consequently considered satisfactory with respect to all of the tests.

The products of both Example 2 and Example 3 displayed satisfactory air porosity, that of the former being approximately 50 CFM and of the latter approximately 40–44 CFM at a pressure drop of 0.5 in. water on a Frazier Porosity Tester.

In contrast, filter units made in accordance with the prior art failed in respect of one or more of the same tests.

What is claimed is:

1. A filter medium particularly adapted for use in an oil filter for an internal combustion engine, said medium comprising a water-laid web of fibers including at least 70% by weight of cellulose fibers, said web having a ream weight of 35 to 180 lb., said web being impregnated with resin in a pattern at its wire side to a depth from 15 to 45% of the total thickness of the web, the amount of said resin being from 9 to 15% by weight of the web, said pattern having first zones free from said resin and other zones impregnated with said resin, at least one surface dimension of each of the first said zones being from 0.1 to 4 mm., the total area of the first said zones being from 35 to 60% of the total surface area of said wire side, and the air porosity of said impregnated web being from 1 to 200 CFM per sq.ft. at a pressure drop of 0.5 inch water on a Frazier Porosity Tester.

2. A filter medium as claimed in claim 1 in which said first zones have a second dimension greater than 4 mm. and said second dimension extends transversely of the machine direction of the web.

3. A filter medium as claimed in claim 1 in which said first zones are in the form of continuous stripes.

4. A filter medium as claimed in claim 1 in which said first zones are in the form of discrete closed areas.

5. A filter medium as claimed in claim 1 in which said cellulose fibers are cotton linters.

6. A filter medium as claimed in claim 1 in which said cellulose fibers have an average alpha cellulose content less than 90% by weight.

7. A filter medium as claimed in claim 1 in which said resin comprises phenol-formaldehyde.

8. A filter medium as claimed in claim 1 in which the amount of the resin is from 11 to 15% by weight of the web.

9. A filter medium particularly adapted for use in an oil filter for an internal combustion engine, said medium comprising a water-laid web of fibers including at least 70% by weight of cellulose fibers, said web having a ream weight of 35 to 180 lb., said web being impregnated with resin in a pattern at its wire side to a depth from 15 to 45% of the total thickness of the web, the amount of said resin being from 9 to 15% by weight of the web, said pattern having first zones free from said resin and other zones impregnated with said resin, the size and shape of each of the first said zones being such that the distance from any point on the surface of each zone to the nearest edge of the zone is from 0.05 to 2 mm., the total area of the first said zones being from 35 to 60% of the total surface area of the wire side, and the air porosity of said impregnated web being from 1 to 200 CFM per sq.ft. at a pressure drop of 0.5 in. water on a Frazier Porosity Tester.

10. A filter medium as claimed in claim 9 in which said cellulose fibers are cotton linters.

11. A filter medium as claimed in claim 9 in which said cellulose fibers have an average alpha cellulose content less than 90% by weight.

12. A filter medium as claimed in claim 9 in which said first zones are in the form of continuous stripes.

13. A filter medium as claimed in claim 9 in which said first zones are in the form of discrete closed areas.

14. A filter medium as claimed in claim 9 in which said resin comprises phenol-formaldehyde.

* * * * *